UNITED STATES PATENT OFFICE.

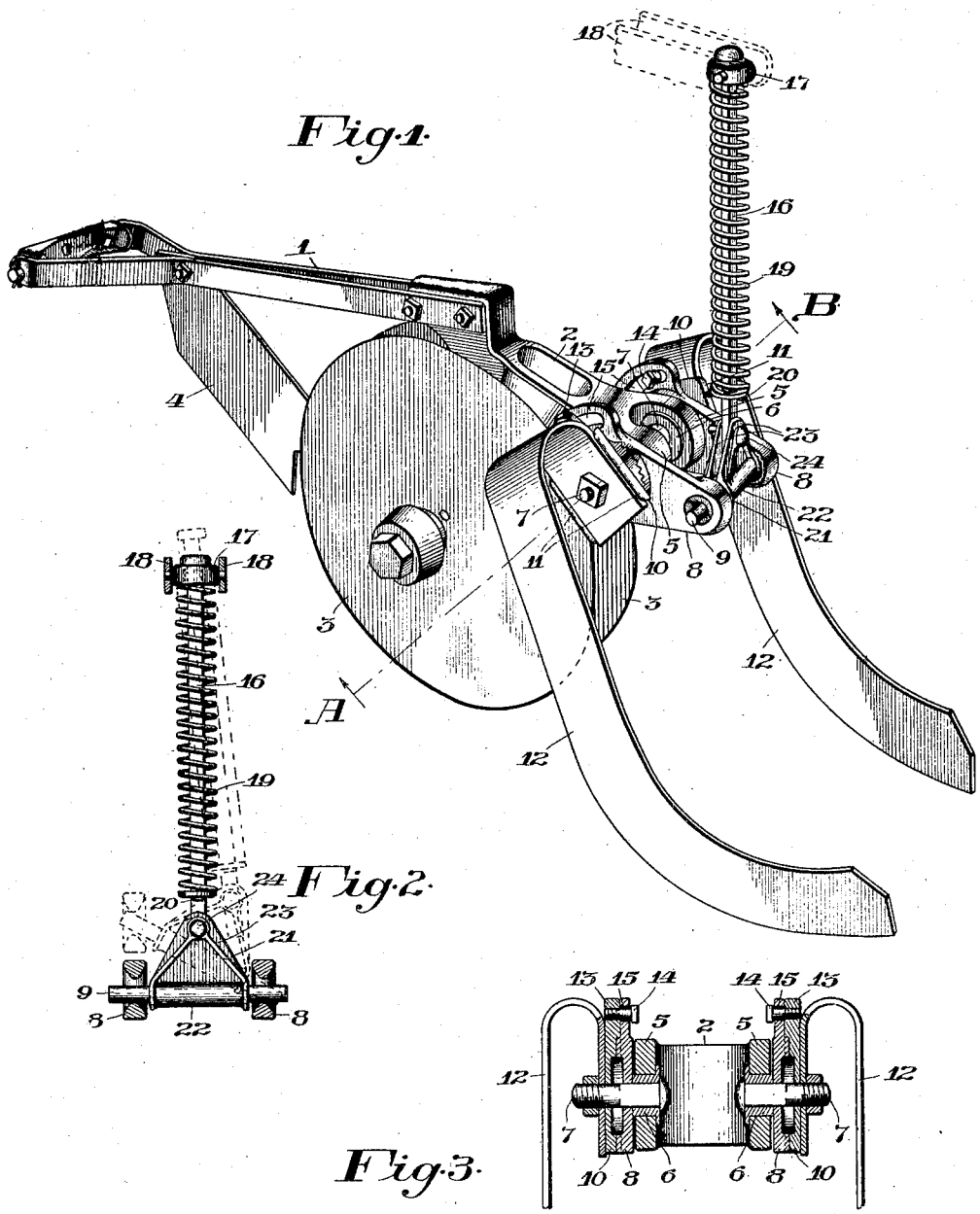

ALBERT GRIEVES, OF SPRINGFIELD, OHIO, ASSIGNOR TO INTERNATIONAL HARVESTER COMPANY, A CORPORATION OF NEW JERSEY.

CORN-PLANTER.

1,029,679. Specification of Letters Patent. Patented June 18, 1912.

Application filed December 11, 1911. Serial No. 664,921.

*To all whom it may concern:*

Be it known that I, ALBERT GRIEVES, a citizen of the United States, residing at Springfield, in the county of Clark and State of Ohio, have invented certain new and useful Improvements in Corn-Planters, of which the following is a specification.

My invention relates to corn planters, and in particular to the means for controlling the movement of the spring-pressed covering blades that trail in rear of the furrow openers and operate to close the furrow after the corn has been deposited therein, and consists in providing mechanism whereby a differential pressure is applied to the adjacent independently rising and falling blades for the purpose of permitting them to more readily ride over trash or other obstructions in their path of advance; the object of my invention being to provide improved means for the purpose indicated, simple in construction and efficient in operation. I attain these objects by means of the mechanism illustrated by the accompanying drawings, in which—

Figure 1 represents a side elevation in perspective of a furrow opening mechanism designed to be connected with other parts of the corn planter and having my invention forming a part thereof; Fig. 2 is a detached detail, partly in section, and designed to illustrate the operation of the spring pressure mechanism as shown in Fig. 1; and Fig. 3 represents a detail, partly in cross section, of Fig. 1 along line A—B, illustrating the manner of connecting the covering blades with their supporting arms.

Like reference characters designate the same parts throughout the several views.

1 represents a common form of drag bar having means at its front end whereby it may be connected with the frame of the corn planter, 2 a seed conduit secured to the rear end of the drag bar and having furrow opening disks 3 journaled upon oppositely disposed bearings carried by the lower end thereof, and 4 represents a runner having its upper end secured to the drag bar, the body thereof extending rearward and downward toward the furrow opening disks. Extending rearward from the upper end of the seed conduit are two ear members 5, spaced apart, arranged in parallel vertical planes and having axially alined transverse openings therein that are adapted to receive thimbles 6 therein, the thimbles being provided with axial openings that receive bolts 7.

8 represents arms having openings at their front ends that receive the bolts 7, and other transverse openings at their rear ends that loosely receive a cross pin 9 in a manner permitting the oppositely disposed arms to swing freely in vertical planes independent of each other. The outer faces of the front ends of said arms are provided with radially arranged corrugations that operatively engage with corresponding corrugations upon the inner surfaces of clip members 10, provided with axial openings that receive the bolts 7, and upon their outer surfaces with ribs 11 that are adapted to receive between them the upper down-turned ends of covering blades 12 that have their lower ends curved downward, rearward and inward. The bolts 7 are received by openings in the blades and secure the parts in operative relation. The clips are provided with upwardly extending ear portions 13 that receive the threaded ends of bolts 14 that are received by slots 15 in the arms, that are arranged concentric with the axis 7 thereof in a manner whereby the arms may be adjusted angularly relative to their axes independently.

Spring pressure is applied to the covering blades by means of a common form of link 16, having its upper end slidably received by a rocking yoke 17, having opposite ends thereof pivotally connected with arms 18, that may be operatively connected with the planter structure in any preferred manner. A compression spring 19 encircles the link and is operative between the yoke 17 and a pin 20 at the lower end of the link to yieldingly resist a downward movement of arms 18 and the yoke connected therewith.

21 represents a bracket having a sleeve portion 22 at its lower end that receives the pin 9 between the arms 8, and provided with vertically arranged upwardly extending ear portions 23 that are spaced apart in the direction of the line of advance of the planter in a manner to receive between them the lower end of the link 16, the link being pivotally connected therewith intermediate the arms 8 by means of a pin 24, the axis of the pin being at right angles with that of the pin 20 and in a higher plane, whereby when one of the covering blades meets with an obstruction and rises to relieve itself therefrom, the bracket rocks about the axis of pin 24 as the arm carrying the rising blade lifts upward on the end of pin 9 in a manner to carry the axis of pin 24 laterally, as shown by dotted lines in Fig. 2, until a line drawn from the bearing of pin 9 upon the opposite arm, through the yoke 17, will pass near the axis of pin 24 and thereby relieve the opposite arm of practically all pressure of the spring mechanism while the obstruction is being passed, the mechanism operating in a differential manner in directing the force of the spring either to one or the other in a vertical plane as the blades rise and fall independently, or to equalize the pressure thereof when the two blades are operating under normal conditions.

What I claim as my invention, and desire to secure by Letters Patent, is:

1. A corn planter including, in combination, furrow openers, a seed conduit, independently rising and falling covering blades trailing in rear of said furrow openers, and spring pressure mechanism operative to yieldingly press said blades in contact with the soil, said mechanism including means whereby the pressure is distributed in a differential manner upon the two rising and falling blades, less upon the higher and greater upon the coacting blade.

2. A corn planter including, in combination, furrow openers, a seed conduit, independently rising and falling covering blades trailing in rear of said furrow openers and upon opposite sides thereof, a spring pressure mechanism operative to yieldingly press said blades in contact with the soil, said mechanism including a rocking bracket having opposite ends thereof loosely connected with said blades, and a spring-pressed link connected with said bracket in a plane above the connection thereof with said blades, whereby a rising or falling movement of said blades independently will cause the axis of the connection of said link with said bracket to move from side to side of a longitudinal vertical plane and thereby cause differential pressure to be directed upon the independently movable blades.

3. A corn planter including, in combination, a seed conduit, furrow openers connected with said seed conduit, arms pivotally connected with said seed conduit, extending in rear thereof and adapted to rise and fall independently at their rear ends, covering blades secured to said arms, a rocking bracket having opposite ends thereof loosely connected with the rear ends of said arms, and a spring-pressed link pivotally connected with the middle portion of said bracket above the pivotal connection thereof with said arms, whereby a rising or falling movement of said arms independently will cause the axis of the pivotal connection of said link with said bracket to move from side to side of a longitudinal vertical plane in a manner to cause a differential pressure to be directed toward the independently movable arms.

ALBERT GRIEVES.

Witnesses:
H. J. GUYTON,
ARTHUR H. TOMLINSON.